(12) United States Patent
Zanolari

(10) Patent No.: US 10,844,646 B2
(45) Date of Patent: Nov. 24, 2020

(54) LIGHT GRID WITH DISTANCE INFORMATION TO DISTINGUISH BETWEEN A NORMAL CASE AND A SAFETY CASE BETWEEN A DOOR EDGE AND AN OBJECT

(71) Applicant: CEDES AG, Landquart (CH)

(72) Inventor: Loris Zanolari, Igis (CH)

(73) Assignee: CEDES AG, Landquart (CH)

( * ) Notice: Subject to any disclaimer, the term of this patent is extended or adjusted under 35 U.S.C. 154(b) by 99 days.

(21) Appl. No.: 16/281,415

(22) Filed: Feb. 21, 2019

(65) Prior Publication Data

US 2019/0264487 A1    Aug. 29, 2019

(30) Foreign Application Priority Data

Feb. 27, 2018    (EP) .................................... 18158982

(51) Int. Cl.
*E06B 9/68*    (2006.01)
*E05F 15/43*    (2015.01)
(Continued)

(52) U.S. Cl.
CPC ............... *E05F 15/43* (2015.01); *E06B 9/68* (2013.01); *E06B 9/88* (2013.01); *F16P 3/144* (2013.01);
(Continued)

(58) Field of Classification Search
CPC ................. G06F 3/0421; G06F 3/0428; E05Y 2900/106; E05Y 2400/32; E05F 15/43;
(Continued)

(56) References Cited

U.S. PATENT DOCUMENTS 5,079,417 A  *  1/1992  Strand ...................... F16P 3/12
                                                        250/221
2010/0325959 A1   12/2010  De Coi et al.
(Continued)

FOREIGN PATENT DOCUMENTS

EP    1 841 942 B1    1/2009
EP    2 506 034 A1    10/2012
(Continued)

OTHER PUBLICATIONS

Extended European Search Report (Application No. 18 158 982.1) dated Aug. 24, 2018.

*Primary Examiner* — Que Tan Le
(74) *Attorney, Agent, or Firm* — Burr & Brown, PLLC

(57) ABSTRACT

Light grid for protecting the door edge of a motor-driven door against collision with an object, having a transmitter strip and a receiver strip with transmitter elements and receiver elements, for detecting an object in the plane of the door panels by interruption of the reception of individual receiver elements. An evaluation device distinguishes between normal and safety cases based on the detection of a status for the door, identifies the safety case if the number of uninterrupted receiving elements between door edge and object falls below a critical number, and identifies the normal case if the safety case is not identified. A communication device outputs a signal for the status. The evaluation device determines a distance value corresponding to the number of uninterrupted receiver elements below the door edge up to the first interrupted element, and the communication device varies the frequency as a function of the distance value.

10 Claims, 2 Drawing Sheets

(51) Int. Cl.
*G01V 8/20* (2006.01)
*E06B 9/88* (2006.01)
*F16P 3/14* (2006.01)

(52) U.S. Cl.
CPC .......... *G01V 8/20* (2013.01); *E05F 2015/436* (2015.01); *E05Y 2400/44* (2013.01); *E05Y 2800/21* (2013.01); *E05Y 2800/242* (2013.01); *E05Y 2900/106* (2013.01); *E05Y 2900/11* (2013.01); *E06B 2009/6827* (2013.01); *E06B 2009/6836* (2013.01)

(58) Field of Classification Search
CPC ................ E05F 15/76; E05F 2015/436; G07C 2009/00928; A63F 2009/2447; B60J 7/1204; B60J 7/141; E06B 2003/7044; E06B 2009/6836; E06B 9/68; F16P 3/144; G01V 8/20
USPC .............................................. 250/221, 214 R
See application file for complete search history.

(56) References Cited

U.S. PATENT DOCUMENTS

| | | |
|---|---|---|
| 2012/0292514 A1 | 11/2012 | Pfiffner |
| 2013/0106601 A1 | 5/2013 | Leutenegger et al. |

FOREIGN PATENT DOCUMENTS

| | | |
|---|---|---|
| EP | 2 229 496 B1 | 2/2013 |
| EP | 2 574 718 B1 | 10/2013 |
| EP | 2 845 985 A1 | 3/2015 |
| EP | 2 586 959 B2 | 9/2016 |

\* cited by examiner

LIGHT GRID WITH DISTANCE INFORMATION TO DISTINGUISH BETWEEN A NORMAL CASE AND A SAFETY CASE BETWEEN A DOOR EDGE AND AN OBJECT

FIELD OF THE INVENTION

The present invention relates to a light grid with a transmitter strip having transmitter elements and a receiver strip having receiving elements for forming a grid of light barriers.

BACKGROUND OF THE INVENTION

Light grids of the generic type mentioned are already known from the prior art. Patents EP 1 841 942 B1, EP 2 229 496 B1, EP 2 574 718 B1 and EP 2 586 959 B2 describe such a generic light grid. In particular, the product GridScan/Mini designed by the applicant CEDES AG is identified as prior art. This light grid is a SIL 2 certified safety curtain for application, in particular, to rolling or sectional doors, which interprets the interruptions of its light beams to mean that a dangerous state of the door has been detected. This status is transmitted by the light grid to the door as either a normal case or safety case with a safe signal known as FSS. Safety case is the term used for an imminent danger. This is the case when the door edge of the panel of the door approaches too close to an object detected in the light grid. The signal transmitted in the normal case is a signal modulated at a frequency of 1 kHz, and in the safety case the LOW or GND signal. The signal is safe because in the event of failure of the signal the safety case is transmitted automatically. Typical control devices of doors or gates are designed to expect the modulated signal with a frequency in a permissible frequency range between 0.2 kHz and 2 kHz as a signal and interpret it as the normal case.

SUMMARY OF THE INVENTION

The object of the present invention is to provide an improved light grid.

The light grid according to the present invention is a light grid for protecting the edge of a motor-driven door or gate against collision with an object. The light grid has a transmitter strip and a receiver strip with transmitter and receiver elements for the detection of an object in the plane of the door panel by interruption of the reception of individual receiver elements. The light grid also comprises an evaluation device, which is designed to distinguish between the normal case and safety case based on the detection of a status for the door, and to identify the safety case if the number of uninterrupted receiving elements between door edge and object falls below a critical number and to identify the normal case if the number of uninterrupted receiving elements between door edge and object is not below a critical number. The light grid also has a communication device which is designed to output a signal for the status, in particular, to a control device of a door, which in the safety case is a LOW signal or a non-frequency-modulated signal or a GND signal and in the normal case is a signal modulated with a frequency. The evaluation device is designed to determine a distance value which corresponds to the number of uninterrupted receiver elements below the door edge up to the first interrupted element. In addition, the communication device is designed to vary the frequency of the frequency-modulated signal as a function of the distance value.

LOW means low signal level, in particular, significantly lower (<50%, in particular <10%) voltage or current in relation to the frequency-modulated signal. GND means, in particular, ground or earth, or reference potential in particular for the frequency-modulated signal.

The light grid according to the present invention can provide the advantage that, in addition to the information about the status, another distance value is transmitted for the distance between the door edge and the object.

The communication device is preferably designed to transmit the distance value with the same signal as for the status of the normal case. The same signal here means the same signal type, i.e. due to the nature of a frequency-modulated signal. This can provide the advantage that no other signal needs to be defined.

In particular, the communication device can be designed to output the signal for the safety case, for the normal case and the distance value via a single signal cable. This can provide the advantage that no other signal cable need be implemented.

In particular, the communication device is designed to vary the frequency of the frequency-modulated signal as a function of the distance value within a permissible frequency range, which the control device of the door expects for the frequency-modulated signal for the normal case. This permissible frequency range may comprise, in particular, the range from 0.2 kHz to 2 kHz. In particular, the distance value can be transmitted with the signal for the normal case. In particular, the distance value can be transmitted as a signal for the normal case. This can provide the advantage that the light grid can also be used for doors with control devices which do not expect a distance value.

The communication device is preferably designed to vary the frequency proportionally as a function of the distance interval. This can provide the advantage that the information relating to the distance is coded in a simple and plausible way. This can reduce the costs and increase the functional safety.

The communication device is preferably designed to vary the frequency as a function of the distance interval in stages. This can provide the advantage that the space of values for the distance can be kept small. This can reduce the costs and increase the functional safety.

The communication device is preferably designed to vary the frequency as a function of the distance value in 2 or 3 stages. This can provide the advantage that only a few specific ranges of the distance are distinguished which are of particular interest. This can reduce the costs and increase the functional safety.

The communication device is preferably designed to vary the frequency as a function of the distance value in at least 2 stages, at least one stage of which corresponds to starting up or decelerating the door panel of the door. This can provide the advantage that the particularly important ranges of the distance which represent the startup of the braking operation are particularly taken into account and thus the control device of the door can initiate a gentle speed change starting from the typical distance value. This can provide the advantage that the door is protected, power spikes are prevented, the service life of the door is increased and maintenance costs reduced.

Preferably, the communication device is designed to increase the frequency as a function of the distance value with decreasing distance and/or distance value. This leads to the fact that with increasing proximity of the door edge to the object, a higher frequency is output. A higher frequency can enable faster switching times. Thus, this can provide the advantage that the control device of the door can react more quickly with an increasing level of danger. This can provide the advantage of increasing the safety of the door.

The door according to the present invention is a door with a door panel with a door edge and with an above-mentioned light grid according to the present invention. The door comprises a control device for controlling and protecting the drive of the door, in order to initiate the stoppage or reversal of a closing door panel in a safety case. The control device is designed to accept from the light grid a signal for the status of the door as either a normal case or a safety case and to interpret a frequency-modulated signal as the normal case and accordingly to interpret a LOW signal or a non-frequency-modulated signal or the GND signal as a safety case. In addition, the control device is designed to interpret a change of frequency of the signal for the normal case as a distance value in order, in particular, to vary the speed of the door panel as a function of this distance value. The door according to the present invention can implement all the above-mentioned advantages according to the present invention accordingly.

The use according to the present invention is the use of the above-mentioned light grid according to the present invention for a door with a control device for controlling the drive of the door, which is designed to accept a signal from the light grid for the status of the door, wherein the signal for the normal case is modulated with a frequency and for the safety case is the LOW signal or a non-frequency-modulated signal or the GND signal.

It should be noted that the door of the use according to the present invention of the above-mentioned light grid according to the present invention does not necessarily interpret the change in the frequency of the frequency-modulated signal for the normal case as a distance value. The door receives from the light grid according to the present invention only the information about the status which it would receive from a light grid from the prior art. This can provide the advantage that the light grid according to the present invention can also be used in and with a door according to the prior art. This can provide the advantage that the light grid according to the present invention can be used in a larger range of doors.

Further features of the present invention are specified in the drawings.

The specified advantages in each case can also be implemented for feature combinations in the context of which they are not mentioned.

BRIEF DESCRIPTION OF THE DRAWINGS

Exemplary embodiments of the present invention are shown in the drawings and will be explained in more detail in the following. Identical reference numerals in the individual figures designate corresponding elements.

DETAILED DESCRIPTION OF THE INVENTION

Figure 1:
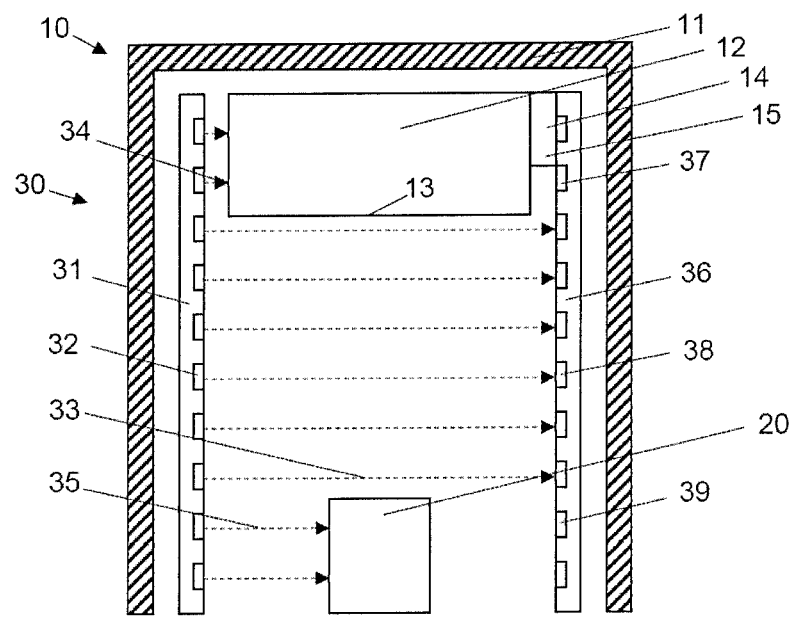
FIG. 1 shows a door with light grid.

FIG. 1 shows a door according to the present invention having a light grid according to the present invention. The door 10 is a roller door or a sectional door or another type of door with a vertically displaceable movable door panel 12. The door 10 is situated in a wall, not shown, with a door opening 11 and comprises the door panel 12 with the door edge 13. The door edge is the part of the door panel which leads the closing movement of the door and would impact on an object first. The door comprises a door controller 14 and a door drive 15. The door controller is the control device 14 of the door, which controls the door drive and thus the movement of the door panel. The plane described by the door edge that is moved is the door plane.

The light grid 30 is arranged in the door plane. The light grid 30 has a transmitter strip 31 and a receiver strip 36 as well as an evaluation device, not shown here, and a communication device. The transmitter strip and the receiver strip are arranged in the door plane to the side of the door panel, assumed to be closed. The transmitter strip has transmitter elements 32 and the receiver strip has receiver elements 37, 38, 39 which are allocated to one another at the same height and form horizontal light barriers with light beams 33, 34, 35.

Between the transmitter strip and the receiver strip are located the door panel 12 and an object 20, which interrupt the light beams 34, 35. The uninterrupted light beams impinge on the associated receiver elements 38. The light beams 34 which are interrupted by the door panel cannot reach the upper receiver elements 37. The light grid uses a known method to mask those receiver elements 37 which are interrupted by the door panel from receiving the light beams 34 of their associated transmitter elements. These masked receiver elements 37 are no longer used for analysis.

Two receiver elements 39 are interrupted by the object 20 from receiving the light beams 35 of their associated transmitter elements. Between the door edge 13 and the object 20, six receiver elements 38 are not interrupted from receiving the light beams of their associated transmitter elements 32. Between door edge and object for the number of the receiver elements means from below the door edge up to the first uninterrupted receiver element. This is the distance from the light grid measurable distance between the door edge and the object. This distance is assigned a distance value by the evaluation device. The distance value is the number of uninterrupted receiver elements which are located below the door edge up to the first interrupted receiver element.

The processing device is designed to distinguish a status for the door and to determine the distance value. The status can be the normal case or the safety case. The evaluation device is designed to identify the safety case whenever the number of uninterrupted receiver elements between the door edge and the object falls below a critical number. Otherwise, the evaluation device detects the normal case. If the normal case is detected, the evaluation device also detects the distance value.

If the door edge is more than 50 cm above the ground, the critical number corresponds to the number of uninterrupted receiver elements, which is a length of at least 20 cm. If the door edge is no greater than 50 cm above the ground, the critical number corresponds to the number of uninterrupted receiver elements, which is a length of at least 5 cm.

The communication device is designed to transmit the status and the distance value to the control device of the door via a single signal cable. In the safety case, the communication device switches the signal cable to LOW or GND. In the normal case, the communication device applies a 3.6 V signal to the signal cable that is modulated with a frequency which corresponds to the distance value in a manner which is at least partially distinguishable.

The control device of the door receives the signal from the communication device and controls the drive of the door and thereby the movement of the door panel. In the safety case, the control device of the door stops and reverses the direction of the motion of a closing door panel. In the normal case, the control device of the door accelerates or decelerates the movement of the door panel as a function of the distance value received.

Figure 2:
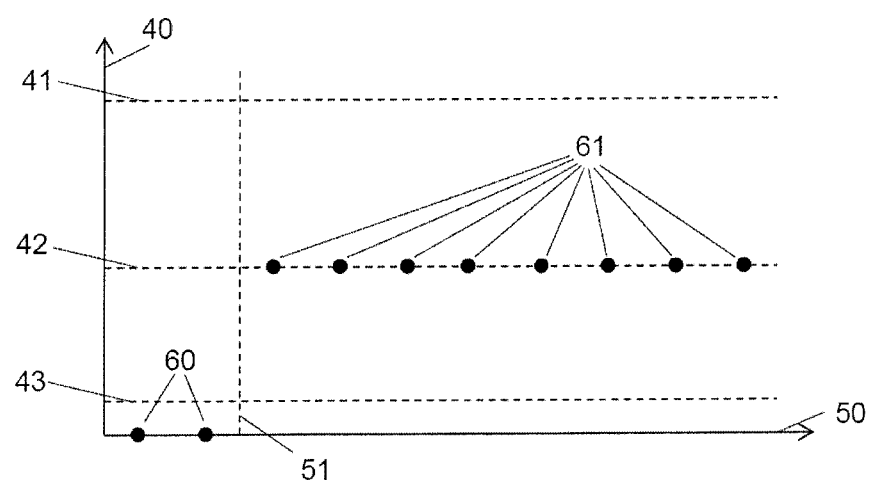
FIG. 2 shows a signal for safety case and normal case according to the prior art.
Figure 3:
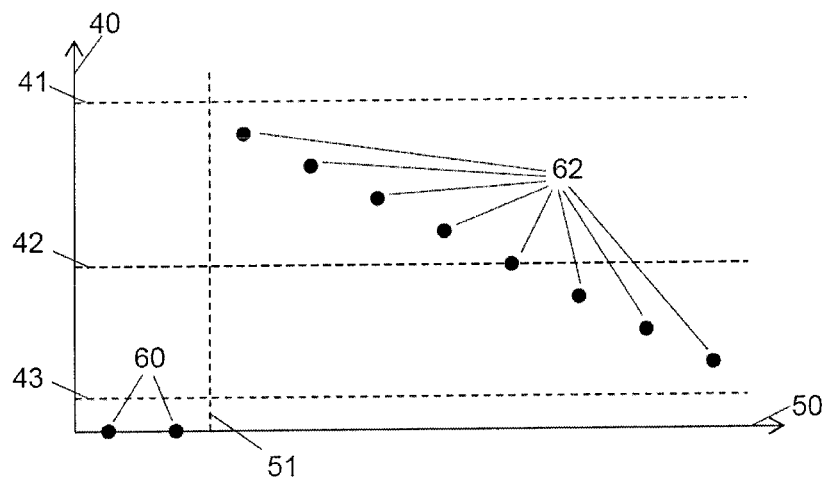
FIG. 3 shows a signal proportional distance value.
Figure 4:
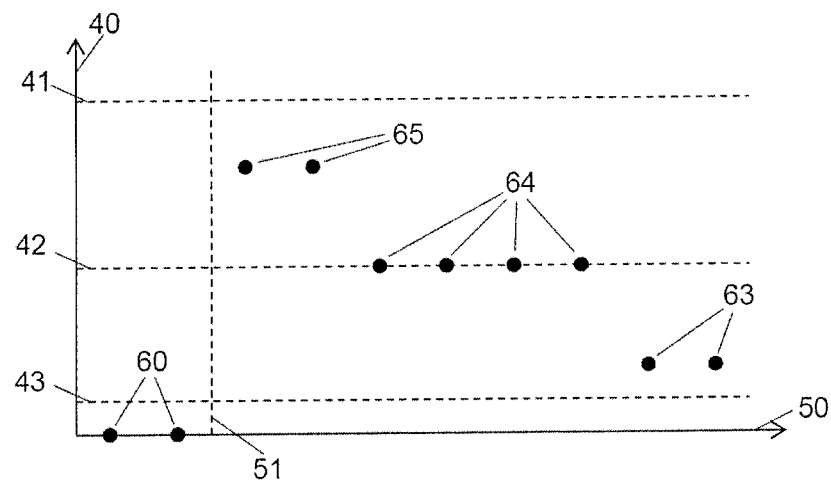
FIG. 4 shows a signal for staged distance value.

FIGS. 2, 3 and 4 show diagrams of the frequency value of the signal from the communication device as a function of the status, and in the case of FIG. 3 also as a function of the distance value.

The diagrams show in the horizontal axis 50 the number of uninterrupted receiver elements from the door edge to the object, i.e. until the first interrupted receiver element. In the case of FIGS. 3 and 4, this corresponds to the distance value. The vertical axis 40 shows the frequency of the signal from the communication device. The dashed vertical line represents the critical distance 51. In the diagrams, this corresponds to three uninterrupted receiver elements. To the left of the critical distance, thus here for less than 3 uninterrupted receiving elements, the safety case applies. To the right of the critical distance, thus here for at least 3 uninterrupted receiving elements, the normal case applies. The lower dashed horizontal line corresponds to the minimum permissible frequency 43 of 0.2 kHz, the middle dashed horizontal line corresponds to the typical frequency 42 of 1 kHz from the prior art and the upper dashed horizontal line corresponds to the maximum permissible frequency 41 of 2 kHz.

In all cases of FIGS. 2, 3 and 4, the frequency of the signal is 0 kHz and GND, if the number of uninterrupted receiver elements between door edge and object is below the critical distance 51. The control device of the door interprets this as a safety case and stops and reverses the direction of a closing door movement.

In all cases of FIGS. 2, 3 and 4, the frequency of the signal lies between the minimum permissible frequency 43 and the maximum permissible frequency 41 if the number of uninterrupted receiver elements between the door edge and the object is greater than the critical distance 51. The control device of the door interprets this as a normal case and does not stop the door without a further command.

FIG. 2 shows the frequency value of the signal from the communication device as a function of the status in accordance with the prior art. In the normal case, for a value of the typical frequency of 1 kHz the frequency remains independent of the number of uninterrupted receiver elements 61 between door edge and object. No distance information will be transmitted to the control device of the door.

FIG. 3 shows the frequency value of the signal from the communication device as a function of the status and the distance value, with a proportional relation of the distance value in the light grid according to the present invention. The frequency values of the uninterrupted receiver elements 62 between door edge and object increase with decreasing distance of the door edge 13 from the object 20. Therefore, together with the status signal for the normal case, a quasi-continuous proportional distance value for the proximity of the door edge 13 to the object 20 is transmitted to the control device of the door. The control device of the door accepts this distance value together with the signal for the normal case and starts to control the acceleration or deceleration of the movement of the door panel as a function of the distance before the door edge reaches the critical distance.

FIG. 4 shows the frequency value of the signal from the communication device as a function of the status and the distance value, with a gradually varied trajectory of the distance value in the light grid according to the present invention. The frequency values of the uninterrupted receiver elements 63, 64, 65 increase in 3 stages with decreasing distance of the door edge 13 from the object 20. Therefore, together with the status signal for the normal case, the information indicating in which of 3 regions the distance of the door edge from the object is located is transmitted to the control device of the door.

In a near range with only a few uninterrupted receiver elements 65 between door edge and object, an increased frequency of approximately 1.8 kHz is transmitted to the control device of the door. The control device of the door accepts the information that the near range has been reached together with the signal for the normal case and slows down the movement of the door panel already in the near range before the door edge reaches the critical distance.

In a far range with only a large number of uninterrupted receiver elements 63 left between the door edge and the object, a low frequency of approximately 0.4 kHz is transmitted to the control device of the door. The control device of the door accepts the information that the far range has been reached together with the signal for the normal case, and accelerates the movement of the door panel already in the far range.

In a middle range with a number of interrupted receiver elements 65 between door edge and object, between the near range and the far range a medium frequency of approximately 1.0 kHz is transmitted to the control device of the door. The control device of the door accepts the information that the middle range has been reached together with the signal for the normal case, and holds the movement of the door panel constant.

LIST OF REFERENCE NUMERALS 10 door
11 door opening
12 door panel
13 door edge
14 door controller
15 door drive
20 object
30 light grid
31 transmitter strip
32 transmitter element
33 light beam, not interrupted
34 light beam, masked
35 light beam, interrupted
36 receiver strip
37 receiver element, masked
38 receiver element with received signal
39 receiver element without received signal
40 frequency axis of the output signal
41 maximum frequency
42 typical frequency
43 minimum frequency
50 number of receiver elements with received signal (distance)
51 critical distance (minimum number of receiver elements with received signal)
60 receiver elements with received signal below the critical number
61 receiver elements with received signal (constant frequency)
62 receiver elements with received signal (proportional frequency)

63 receiver elements with received signal (frequency levels, exit)
64 receiver elements with received signal (frequency levels, travelling)
65 receiver elements with received signal (frequency levels, approach)

The invention claimed is:

1. A light grid for protecting a door edge of a door panel of a motor-driven door against collision with an object, comprising:
   (i) a transmitter strip and a receiver strip with transmitter elements and receiver elements for detecting an object in the plane of the door panel by interruption of the reception of individual receiver elements,
   (ii) an evaluation device which distinguishes between a normal case and a safety case based on the detection of a status for the door, and identifies the safety case if the number of uninterrupted receiving elements between door edge and object falls below a critical number, and identifies the normal case if the safety case is not identified, and
   (iii) a communication device that outputs a signal for the status, which in the safety case is a LOW signal or a non-frequency-modulated signal or a GND signal and in the normal case is a signal modulated with a frequency,
   wherein the evaluation device determines a distance value which corresponds to the number of non-interrupted receiver elements below the door edge up to the first interrupted element, and wherein the communication device varies the frequency as a function of the distance value.

2. The light grid according to claim 1, wherein the communication device transmits the distance value with the same signal as for the status of the normal case.

3. The light grid according to claim 1, wherein the communication device varies the frequency proportionally as a function of the distance interval.

4. The light grid according to claim 1, wherein the communication device varies the frequency in stages as a function of the distance value.

5. The light grid according to claim 4, wherein the communication device varies the frequency as a function of the distance value in 2 or 3 stages.

6. The light grid according to claim 3, wherein the communication device varies the frequency as a function of the distance value in at least 2 stages, at least one stage of which corresponds to starting up or decelerating the door panel.

7. The light grid according to claim 1, wherein the communication device increases the frequency with decreasing distance value.

8. A door having a door panel with a door edge having a light grid according to claim 1 and having a control device for controlling and protecting the drive of the door, in order to initiate the stoppage or reversal of a closing door panel in a safety case, which is designed to accept from the light grid a signal for the status of the door as a normal case or a safety case and which interprets a signal modulated with a frequency as a normal case and which accordingly interprets a LOW signal or a non-frequency-modulated signal or the GND signal as a safety case and which interprets a change in the frequency as a distance value.

9. A door according to claim 8, wherein the control device varies the speed of the door panel as a function of the distance value.

10. A use of a light grid according to claim 1, for a door with a control device for controlling the drive of the door which is designed to accept a signal from the light grid indicating the status of the door wherein the signal for the normal case is modulated with a frequency and for the safety case is either the LOW signal or a non-frequency-modulated signal or the GND signal.

* * * * *